(12) United States Patent
Tallam et al.

(10) Patent No.: US 7,881,081 B1
(45) Date of Patent: Feb. 1, 2011

(54) SYSTEMS AND METHODS FOR REDUCING AC DRIVE COMMON-MODE CURRENTS

(75) Inventors: Rangarajan M. Tallam, Germantown, WI (US); David Leggate, New Berlin, WI (US); David W. Kirschnik, Germantown, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/761,893

(22) Filed: Apr. 16, 2010

(51) Int. Cl.
*H02M 1/12* (2006.01)
(52) U.S. Cl. ..................................................... 363/41
(58) Field of Classification Search .................. 363/41, 363/40, 131, 132
See application file for complete search history.

(56) References Cited

U.S. PATENT DOCUMENTS

| | | | |
|---|---|---|---|
| 5,383,107 A * | 1/1995 | Hopkins et al. ............... 363/41 |
| 6,359,416 B1 | 3/2002 | Rao et al. | |
| 6,469,916 B1 | 10/2002 | Kerkman et al. | |
| 6,477,067 B1 | 11/2002 | Kerkman et al. | |
| 6,541,933 B1 | 4/2003 | Leggate et al. | |
| 6,617,821 B2 | 9/2003 | Kerkman et al. | |
| 6,636,012 B2 | 10/2003 | Royak et al. | |
| 6,703,809 B2 | 3/2004 | Royak et al. | |
| 6,720,748 B1 | 4/2004 | Seibel et al. | |
| 6,819,070 B2 | 11/2004 | Kerkman et al. | |
| 6,819,077 B1 | 11/2004 | Seibel et al. | |
| 6,842,354 B1 | 1/2005 | Tallam et al. | |
| 6,982,533 B2 | 1/2006 | Seibel et al. | |
| 7,034,501 B1 | 4/2006 | Thunes et al. | |
| 7,106,025 B1 | 9/2006 | Yin et al. | |
| 7,164,254 B2 | 1/2007 | Kerkman et al. | |
| 7,215,559 B2 | 5/2007 | Nondahl et al. | |
| 7,336,509 B2 | 2/2008 | Tallam | |
| 7,342,380 B1 | 3/2008 | Kerkman et al. | |
| 7,356,441 B2 | 4/2008 | Kerkman et al. | |
| 7,400,518 B2 | 7/2008 | Yin et al. | |
| 7,471,525 B2 | 12/2008 | Suzuki et al. | |

OTHER PUBLICATIONS

Taiwan Patent Publication TW439350, Jun. 7, 2001.
Emre UN and Ahmet M. Hava, "A Near State PWM Method With Reduced Switching Frequency and Reduced Common Mode Voltage For Three-Phase Voltage Source Inverters", 2007 IEEE.
A.M.De Broe, A.L. Julian, and T.A. Lipo, "Neutral-To-Ground Voltage Minimization In a PWm-Rectifier/Inverter Configuration", Power Electronics and Variable Speed Drives, Sep. 23-25, 1996, Conference Publication No. 429, IEEE, 1996.
Jay M. Erdman, Russel J. Kerkman, David W. Schlegel, and Gary L. Skibinski, "Effect of PWM Inverters on AC Motor Bearing Currents and Shaft Voltages", 1996 IEEE.

(Continued)

*Primary Examiner*—Shawn Riley
(74) *Attorney, Agent, or Firm*—Fay Sharpe LLP; Alexander R. Kuszewski; John M. Miller (57) ABSTRACT

Control systems, methods and power conversion systems are presented for controlling common mode currents in power converters, in which feedback signals used in pulse width modulated inverter switching control are selectively adjusted to ensure minimum differences between the resulting common mode compensated feedback signals according to a common mode dwell time in each pulse width modulation period, with the common mode dwell time being adjusted according to modulation index.

23 Claims, 8 Drawing Sheets

OTHER PUBLICATIONS

A. Muetze & A. Binder, "Don't Lose Your Bearings", Mitigation techniques for bearing currents in inverter-supplied drive systems, 2006 IEEE.

Yeb-Shin Lai and Fu-San Shyu, "Optimal Common-Mode Voltage Reduction PWM Technique for Inverter Control with Consideration of the Dead-Time Effects- Part I: Basic Development", 2004 IEEE.

Qiang Yin, Russel J. Kerkman, Thomas A. Nondahl, and Haihui Lu, "Analytical Investigation of the Switching Frequency Harmonic characteristic for Common Mode Reduction Modulator", 2005 IEEE.

Russel J. Kerkman, David Leggate, Dave Schlegel, and Gary Skibinski, "PWM Inverters and Their Influence on Motor Over-Voltage", 1997 IEEE.

* cited by examiner

SYSTEMS AND METHODS FOR REDUCING AC DRIVE COMMON-MODE CURRENTS

FIELD OF THE INVENTION

The present disclosure relates generally to electrical power conversion and more particularly to systems and modulation techniques for reducing common mode currents in AC motor drives.

BACKGROUND AND INCORPORATION BY REFERENCE

Power conversion systems convert electrical power from one form to another and may be employed in a variety of applications such as motor drives for powering an electric motor using power from an input source. Switching converters include electrical switches actuated in a controlled fashion to selectively convert input power to output power of a desired form such as single or multi-phase AC of a controlled amplitude, frequency and phase to drive an AC motor according to a desired speed and/or torque profile and to provide regulation to accommodate varying load conditions. AC motor drives generally provide a controlled AC output via an inverter that converts DC to AC using an array of high-voltage, high-speed semiconductor-based switching devices. The inverter switches are actuated through various forms of pulse width modulation (PWM), with the timing of the array switching determining the power conversion performance to convert power from a DC bus to variable frequency, variable amplitude single or multi-phase AC output power. The PWM switching states used in the inverter are often modeled in terms of a space vector diagram that includes zero vectors at a diagram origin and non-zero (active) vectors, where such control is sometimes referred to as space vector modulation (SVM) or space vector pulse width modulation (SVPWM). SVPWM at low modulation index, however, can generate high common mode (CM) currents due to very small active vector dwell time, resulting in near simultaneous switching on all three phases, leading to large spikes in the bus voltage with respect to system ground, which can adversely impact various components of the drive such as printed circuit boards, magnetic components (e.g. power supply transformers) and power devices, and to drive issues like deceleration inhibit due to bus pump-up. Previous techniques for addressing such common mode issues include the use of common mode capacitors from DC bus to a solid system ground reference to hold that voltage down and also to prevent pump up of the DC bus, but this approach cannot be used in high resistive ground (HRG) systems or in floating systems where the power source is not solidly referenced to ground. Drive output filters can address the adverse effects of common mode currents but these are bulky and expensive.

U.S. Pat. No. 7,034,501 to Thunes et al., issued Apr. 25, 2006 and assigned to the assignee of the present application describes spacing modulating signals at low speed to prevent overvoltages through reflected waves in a current regulated drive, in which volt-second distortion is compensated by the current regulator. The entirety of this patent is hereby incorporated by reference as if fully set forth herein.

U.S. Pat. No. 7,164,254 to Kerkman et al., issued Jan. 16, 2007 and also assigned to the assignee of the present application discloses common mode voltage reduction techniques in which the switching sequence is modified to avoid using the zero vectors so as to reduce common mode voltages in the motor. The entirety of this patent is hereby incorporated by reference as if fully set forth Herein.

U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein.

U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein.

U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein.

Co-Pending U.S. patent application Ser. Nos. 12/394,613, filed Feb. 27, 2009, and 12/429,309, filed Apr. 24, 2009, both assigned to the assignee of the present application, both of which are hereby incorporated by reference as if fully set forth herein, disclose controlling common mode voltages in AC motor loads using switching sequences with only active vectors, but this can increase output current distortion, particularly at low speeds and the method may not be easily implemented in all PWM waveform generators.

SUMMARY

Various aspects of the present disclosure are now summarized to provide a basic understanding of the disclosure, where the following is not an extensive overview of the disclosure, and is intended neither to identify certain elements of the disclosure, nor to delineate the scope thereof. This summary presents certain concepts of the disclosure in a simplified form prior to the more detailed description that is presented hereinafter.

The present disclosure is directed to pulse width modulation techniques for controlling common mode voltages or currents in an active power converter, and finds particular utility in association with switching inverters used to drive AC motor loads. Disclosed are systems, methods and power conversion systems are presented for controlling common mode voltages and/or currents in power converters, in which feedback signals used in pulse width modulated inverter switching control modified according to a common mode dwell time so as to ensure minimum differences therebetween to create common mode compensated feedback signals for use in PWM switching control signal generation in motor drives and other power converters providing AC outputs.

In accordance with one or more aspects of the present disclosure, a power conversion system is provided, which includes an inverter with a switching network between a DC circuit and AC terminals, as well as a switch control system operative to provide the switching control signals by pulse width modulation at least partially according feedback signals or values representing AC phase outputs and according to the position of a reference vector in a space vector modulation diagram. The switch control system includes a common mode reduction component which selectively adjusts one or more feedback signals or values to provide common mode compensated feedback signals or values having minimum differences therebetween based at least partially on a common mode dwell time.

The common mode dwell time may be adjusted according to modulation index in certain embodiments, and the common mode dwell time value may be provided by an external source. In certain implementations, feedback signals φ are adjusted according to the formulas (max−mid)≧2($T_{dwell\_CM}$/$T_{PWM}$) and (mid−min)≧2($T_{dwell\_CM}$/$T_{PWM}$), where $T_{dwell\_CM}$ is the common mode dwell time and where $T_{PWM}$ is the pulse width modulation period. In some embodiments, the switch control system accumulates common mode adjustment amounts for each feedback signal or value in each PWM period and adjusts the value(s) in a subsequent PWM period to compensate for the adjustments made in a previous period. The control system may further include reflected wave compensation components and/or deadtime compensation components for further selective adjustment of the feedback signals.

In accordance with further aspects of the present disclosure, a method is provided for addressing common mode issues in power conversion systems. The method includes providing pulse width modulated inverter switching control signals to a switching inverter to convert DC power for providing AC output power based on feedback signals and the position of a reference vector in a space vector modulation diagram, as well as determining max, mid, and min ones of the feedback signals in each PWM period. The method further includes selectively adjusting one or more feedback signals or values to provide common mode compensated feedback signals having minimum differences therebetween based at least partially on a common mode dwell time in each PWM period.

In certain embodiments, the feedback signals or values are adjusted higher or lower according to the formulas (max−mid)≧2($T_{dwell\_CM}$/$T_{PWM}$) and (mid−min)≧2($T_{dwell\_CM}$/$T_{PWM}$), where $T_{dwell\_CM}$ is the common mode dwell time and where $T_{PWM}$ is the pulse width modulation period. The method may also include accumulating common mode adjustment amounts for each feedback signal or value φ in each pulse width modulation period, and adjusting one or more feedback signals or values higher or lower in a subsequent pulse width modulation period to compensate for the common mode reduction adjustments made in a previous pulse width modulation period. Some embodiments of the method also include selectively adjusting the common mode dwell time based in whole or in part on a modulation index associated with the reference vector, and certain embodiments further include receiving the common mode dwell time from an external source.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Referring now to the figures, several embodiments or implementations of the present disclosure are hereinafter described in conjunction with the drawings, wherein like reference numerals are used to refer to like elements throughout, and wherein the various features are not necessarily drawn to scale. The disclosure provides pulse width modulation methods and control systems for operating switching power converters in which common mode current problems are mitigated by selective adjustment of feedback modulating signals used in pulse width modulated inverter switching control according to a common mode dwell time in order to ensure minimum differences between the modulating signals. Various aspects of the disclosure are hereinafter illustrated and described in the context of motor drives with internal active or passive rectifiers and inverters for driving multiphase AC motors. However, the disclosed techniques may be employed for common mode current reduction in any form of power conversion system, including those providing single or multiphase AC outputs, those deriving DC input power from any suitable source, and those that drive motors or other AC loads, wherein all such alternate implementations and applications are deemed to fall within the scope of the present disclosure.

Figure 1A:
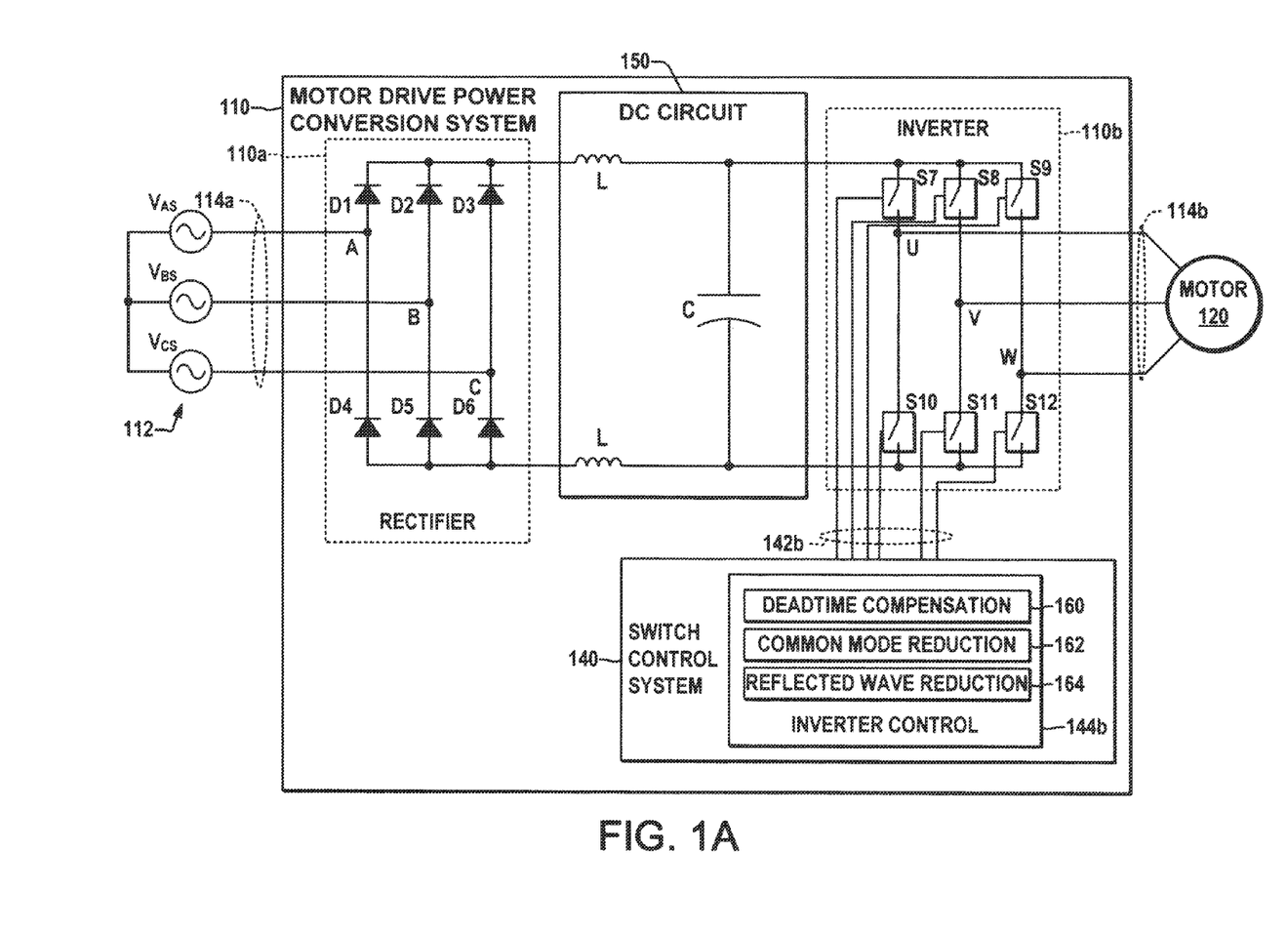
FIG. 1A is a schematic diagram illustrating an exemplary voltage source converter type motor drive power conversion system with a passive input rectifier and a switching inverter controlled according to various common mode reduction aspects of the disclosure to drive a three-phase AC motor by converting power from an intermediate DC circuit.
Figure 1B:
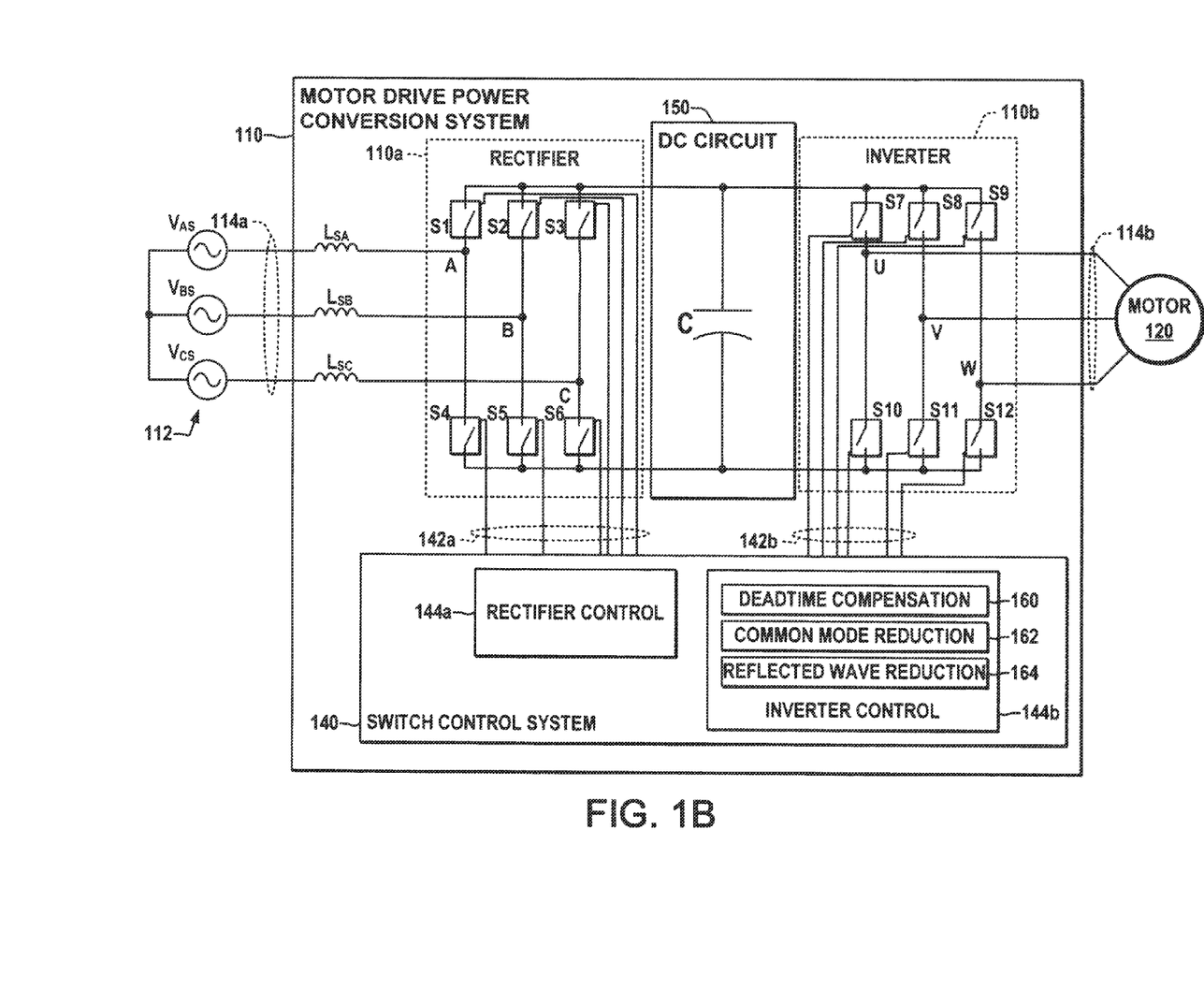
FIG. 1B is a schematic diagram illustrating another exemplary motor drive power conversion system with an active rectifier and a switching inverter controlled according to various aspects of the disclosure to drive an AC motor.

FIGS. 1A and 1B illustrate exemplary switching type AC-DC-AC motor drive conversion systems 110 configured to drive a multiphase AC motor 120, such as an induction motor, in which various aspects of the disclosure may be implemented. The exemplary power converter 110 is a voltage source converter type system driven by a multiphase AC power source 112 providing multiphase AC electric power to an input 114a. The system 110 includes a line side rectifier 110a and a machine (load) side switching inverter 110b, where the rectifier 110a may be a passive type with diode rectifiers D1-D6 as shown in the embodiment of FIG. 1A, or may be a switching rectifier with switching devices S1-S6 as shown in the embodiment of FIG. 1B. The inverter 110*b* and optionally the switching rectifier 110*a* (FIG. 1B) are operated by a switch control system 140 for motor drive operation where the rectifier 110*a* and inverter 110*b* are coupled by an intermediate DC circuit 150 to selectively provide three-phase electric output power to drive a motor load 120. In the illustrated example, the three-phase AC power source 112 provides electrical power to the motor drive 110 via a three-phase input 114*a* for conversion to supply a DC bus in the DC circuit 150, with the inverter generating AC output signals using power from the DC circuit 150. The present disclosure may be advantageously employed in association with single-phase and/or multiphase input or output implementations, and the source 112 and load 120 may be operated at any suitable frequency and amplitudes with the motor drive 110 being adapted to receive and convert the input AC power at the supply frequency.

The passive rectifier 110*a* in FIG. 1A operates to rectify the input AC to provide DC power using the diodes D1-D6, where the exemplary DC circuit 150 includes smoothing inductors L and a capacitor C bridging forward and return DC circuit paths. In the active rectifier 110*a* of FIG. 1B, the AC input power is switched by a first set of switches S1-S6 constituting a line side converter (active rectifier) 110*a* in the form of a switching regulator circuit or stage to create an intermediate DC bus current, where the exemplary DC circuit 150 in this example includes a capacitor C to provide a stable DC bus for subsequent inversion to drive the motor 120. On the machine side, the exemplary inverter 110*b* includes an array of switching devices S7-S12 that are operated according to corresponding switching control signals 142*b* to selectively switch the DC power to provide AC power to an AC output 114*b* for driving the motor 120, with the intermediate DC circuit 150 providing forward and reverse current paths between the rectifier 110*a* and the inverter 110*b*. A forward or positive DC path in the circuit 150 is connected to the upper rectifier diodes D1-D3 (FIG. 1A) or rectifier switches S1-S3 (FIG. 1B) and to the upper output switches S7-S9 of the inverter 110*b*, and a negative or return DC path is coupled to the lower rectifier diodes D4-D6 (FIG. 1A) or switches S4-S6 (FIG. 1B) and to the lower output switches S10-S12 of the inverter 110*b*. The exemplary motor drive 110 in FIG. 1B, moreover, includes line reactors (inductors) $L_{SA}$, $L_{SB}$, and $L_{SC}$ connected in series between the input phase sources $V_{AS}$, $V_{BS}$, and $V_{CS}$ (112) and corresponding switch circuit input nodes A, B, and C (114*a*), respectively, of the rectifier 110*a*, and the inverter 110*b* generates three-phase AC output voltages and currents at the output phases U, V, and W (114*b*), wherein other implementations may include various optional input and/or output filter capacitors (not shown).

Figure 1C:
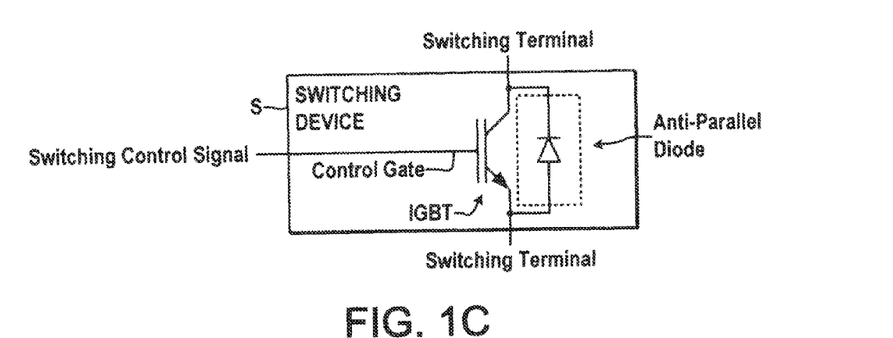
FIG. 1C is a schematic diagram illustrating an exemplary IGBT type switching device with anti-parallel diode used to selectively convert DC power into AC output power in the inverter of FIGS. 1A and 1B.

FIG. 1C illustrates an exemplary IGBT switching device that may be employed as the switching devices S1-S6 (FIG. 1A) and S7-S12 (FIGS. 1A and 1B), wherein these may be any suitable controllable electrical switch types (e.g., thyristors, IGBTs, etc.) that are controlled according to any suitable type or form of switching signals 142*a*, 142*b* from a switch control system 140. The IGBT switching device S example shown in FIG. 1C includes anti-parallel diodes connected in parallel across the switching terminals, with a base or control gate terminal being coupled with the switch control system 140 to receive a corresponding switching control signal for selectively electrically connecting or decoupling the two switching terminals.

Figure 1D:
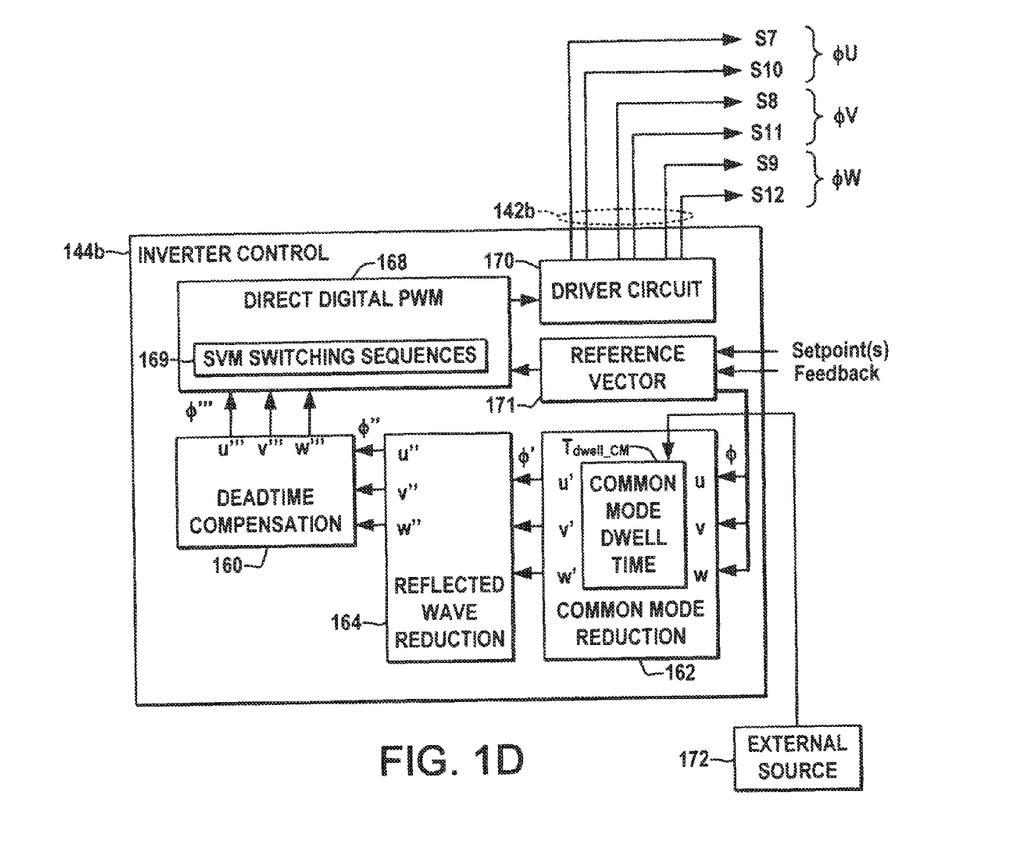
FIG. 1D is a schematic diagram illustrating an exemplary inverter switch control system implementing direct digital pulse width modulation using space vector modulation with common mode reduction, reflected wave reduction, and deadtime compensation components in accordance with various aspects of the present disclosure.
Figure 1E:
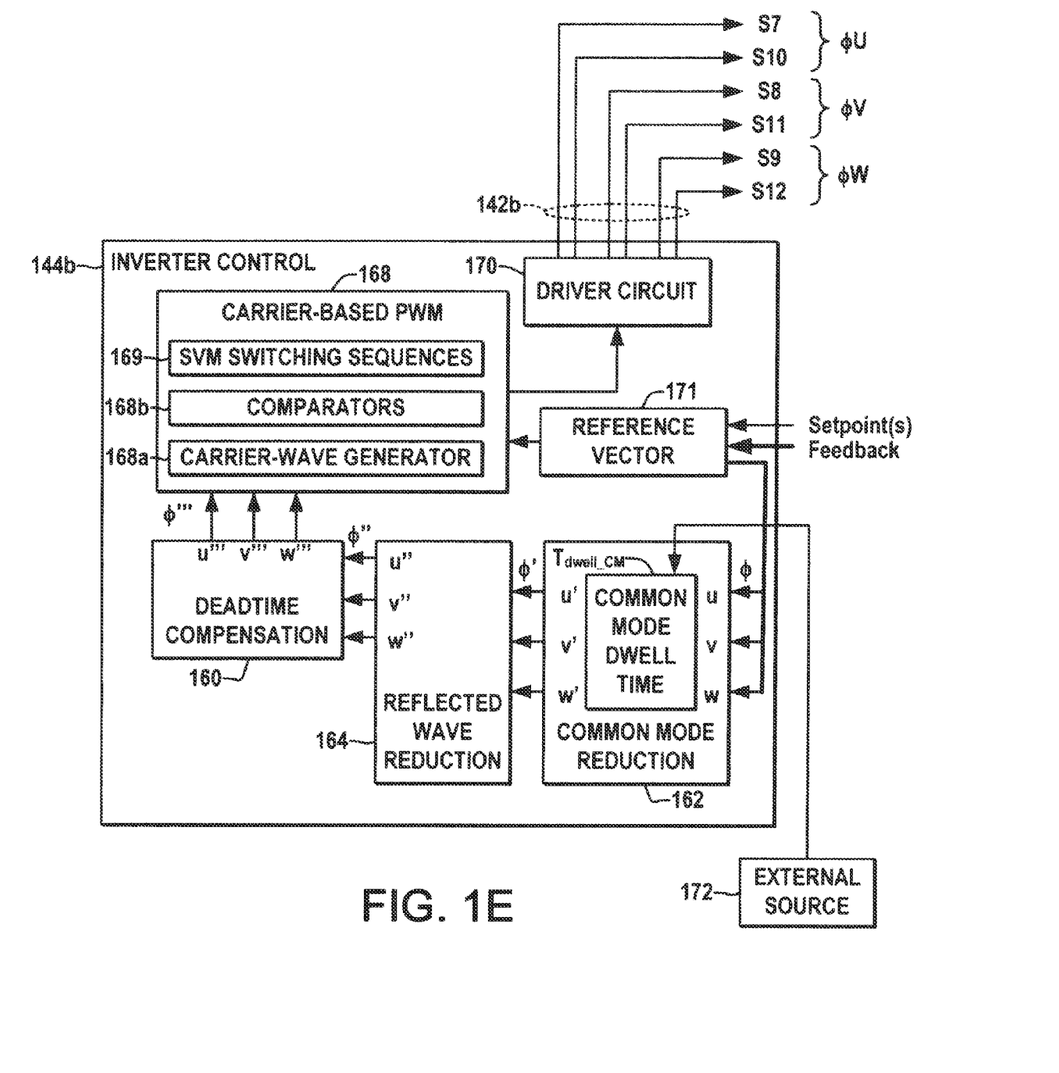
FIG. 1E is a schematic diagram illustrating another exemplary inverter switch control system implementing carrier-based, sine-triangle pulse width modulation with a carrier-wave generator and comparators using modulating feedback signals selectively adjusted by a common mode reduction component, a reflected wave reduction, and a deadtime compensation component in accordance with the present disclosure.

As shown in FIGS. 1D and 1E, switching control signals 142*b* are provided to the inverter 110*b* from an inverter control portion 144*b* of the switch control system 140, which may employ any suitable form of pulse width modulation circuitry to implement direct digital PWM (FIG. 1D) or carrier-based PWM (FIG. 1E) using the selective waveform adjustment techniques described below to reduce common mode currents according to a common mode dwell time $T_{dwell\_CM}$ for inverter switching control. With respect to the switching inverter 110*b*, the embodiment of FIG. 1D provides an inverter switch control system 144*b* including a direct digital pulse width modulation component 168 to provide pulse width modulated switching control signals 142*b* to the inverter 110*b* via a driver circuit 170 based on a reference vector 171 derived from one or more setpoints (e.g., speed, torque, angle, etc.) and on feedback signals or values representing the output of the inverter 110*b* (e.g., phase voltages, currents, motor speed and/or position feedback, etc.) using SVM switching sequences 169. FIG. 1E illustrates another exemplary inverter control 144*b* with a carrier-based (e.g., sine-triangle) pulse width modulation component 168 with a carrier-wave generator 168*a* and comparators 168*b* using SVM switching sequences 169.

Figure 3:
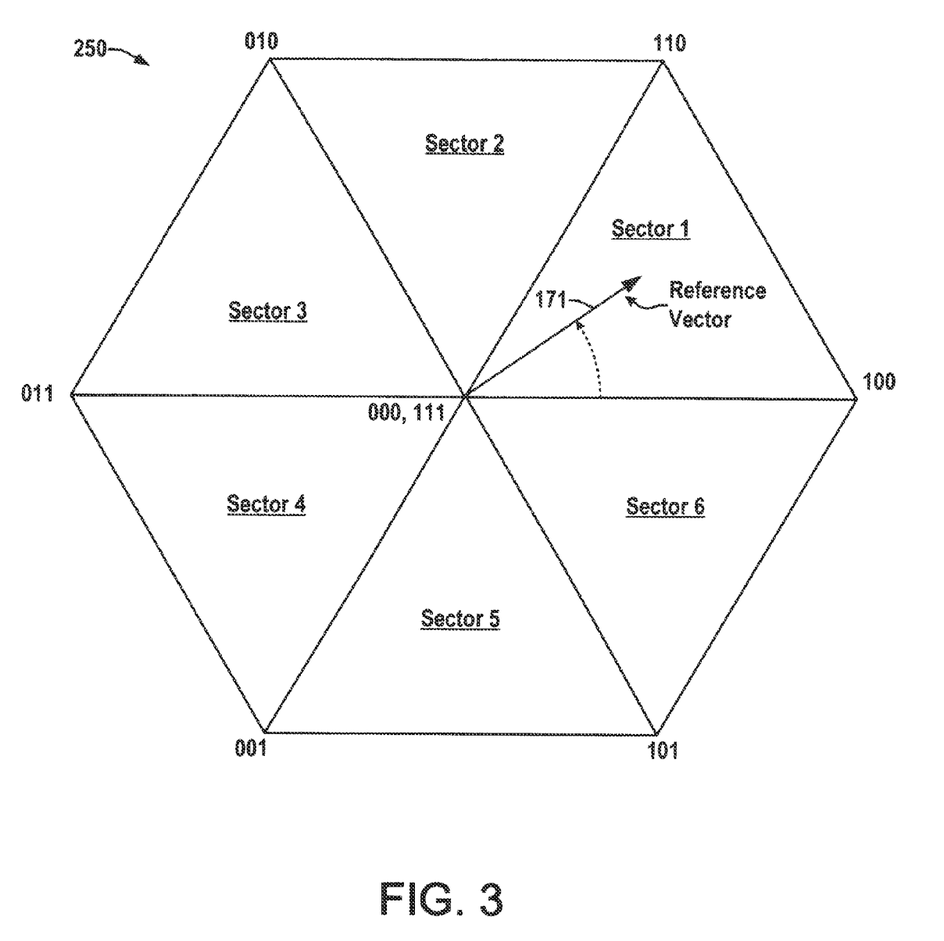
FIG. 3 is a schematic diagram illustrating an exemplary space vector modulation (SVM) diagram having six sectors and a rotating reference vector with peripheral corners defining active switching vectors used in the various pulse width modulation schemes of the present disclosure.

Referring to FIGS. 1D, 1E and 3, the inverter control component 144*b* also includes a common mode reduction component 162, and may optionally include reflected wave reduction and/or deadtime compensation components 164 and 160, respectively, described in greater detail below in accordance with various aspects of the present disclosure. The inverter control component 144*b* receives feedback signals or values φ, which may be of any form, representing the AC phase outputs (phases u, v, and w in the illustrated examples). The switch control system 140 may be provided with one or more setpoint desired values and one or more feedback signals or values by which the output power is controlled. The setpoint inputs and the feedback signals or values φ may be in any suitable form such as an electrical signal, digital data values, etc., and may be received from any suitable source, such as sensors, external networks, switches, a user interface provided on the drive 110, or other suitable source(s).

In operation of the illustrated embodiments, the inverter control component 144*b* provides the switching control signals 142*b* by pulse width modulation at least partially according feedback signals or values φ representing AC phase outputs and according to the position of a reference vector 171 in a space vector modulation diagram 250 (FIG. 3) having a plurality of stationary active space vectors around the periphery of the diagram 250 and two stationary zero vectors at an origin of the diagram 250. The vectors represent unique switching states for the inverter switching network S7-S12 and define a plurality of triangular sectors positioned around the origin, with each sector being defined by a unique set of two active vectors and the zero vectors at the corners of the corresponding triangular sector.

An exemplary space vector modulation diagram 250 shown in FIG. 3 includes six stationary active space vectors 100, 110, 010, 011, 001, and 101 positioned counterclockwise (CCW) around the periphery of the diagram as well as two stationary zero vectors 000 and 111 located at the diagram origin, where the active and zero vectors represent unique switching states for the inverter switching network S7-S12. The diagram 250 also defines six triangular sectors (Sector 1 through Sector 6) positioned around the origin, each of which is defined by a unique set of two of the active vectors and the zero vectors at the corners of the corresponding triangular segment. To operate the inverter, the switch control system 140 provides the switching control signals 142*b* according to a switching sequence 169 corresponding to the diagram sector in which the reference vector 171 is currently located. The inverter control component 144b provides the switching control signals 142b according to a switching sequence 169 corresponding to the diagram sector in which the reference vector 171 is currently located.

Referring to FIGS. 1D, 1E, 2A, and 2B, the inverter control component 144b includes a common mode reduction (CMR) component 162 for combating common mode currents. The CMR component 162 operates in each PWM period $T_{PWM}$ to determine max, mid, and min ones of the feedback signals or values ϕ, and to selectively adjust one or of these higher or lower to provide common mode compensated feedback signals or values ϕ' (u', v', w') having minimum differences therebetween based at least partially on the common mode dwell time $T_{dwell\_CM}$. In certain implementations, moreover, the common mode compensated signals u', v', and w' are then selectively adjusted by an optional reflected wave reduction component 164 to generate reflected wave compensated feedback signals or values ϕ" (u", v", and w") that may be used by the direct digital or carrier-based PWM component 168. In certain embodiments, moreover, a further optional deadtime compensation component 160 may selectively modify or adjust the reflected wave compensated feedback signals or values ϕ" to deadtime compensated feedback signals or values ϕ''' used by the PWM component 168. The PWM component 168 of the switch control system 140 generates PWM inverter switching control signals 142b (and optionally rectifier control signals 142a in the embodiment of FIG. 1B) and the signals 142b are provided to the individual inverter switches S7-S12 from the inverter control component 144b of the switch control system 140 (directly or indirectly using any suitable driver circuitry, not shown) in order to implement a given power conversion task.

The switch control system 140 and the components 144, 160, 162, 164 thereof can be implemented as any suitable hardware, processor-executed software or firmware, programmable logic, or combinations thereof, operative as any suitable controller or regulator by which the motor 120 is controlled according to one or more desired profile(s) or setpoint(s) in open or closed-loop fashion. In this regard, the exemplary controller 140 can be operated in a number of different modes or control schemes, including controlling torque, speed, position, etc., although the particular motor control scheme or application is not a strict requirement of the present disclosure. The switch control system 140 is adapted to provide appropriate switching signals 142 to operate the motor 120 in accordance with a given control strategy, wherein the switch controls 142 provide pulse width modulation (PWM) switch timing control. In operation with an active or passive rectifier 110a, three-phase AC power from the input power source 112 is rectified to provide DC power in the DC circuit 150. DC power from the intermediate DC circuit 150 is then converted to AC output power via the inverter 110b in which the switches S7-S12 receive inverter switching control signals 142b from the inverter control component 144b of the controller 140 in order to provide AC power of appropriate amplitude, frequency, and phase to the motor 120 in a controlled fashion.

Figure 2A:
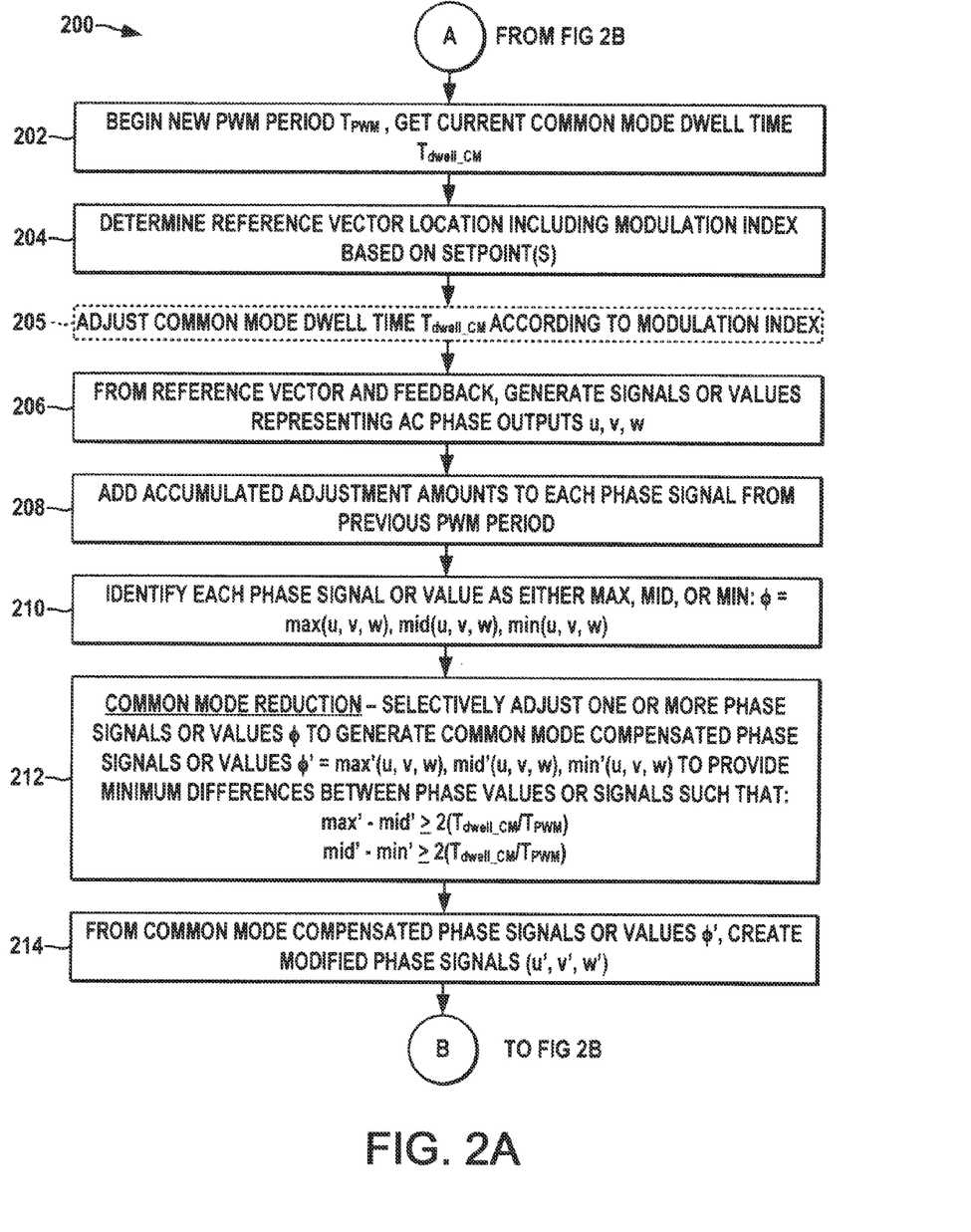
FIGS. 2A and 2B depict a flow diagram illustrating an exemplary method for controlling a pulse width modulated power conversion system in accordance with other aspects of the present disclosure.
Figure 2B:
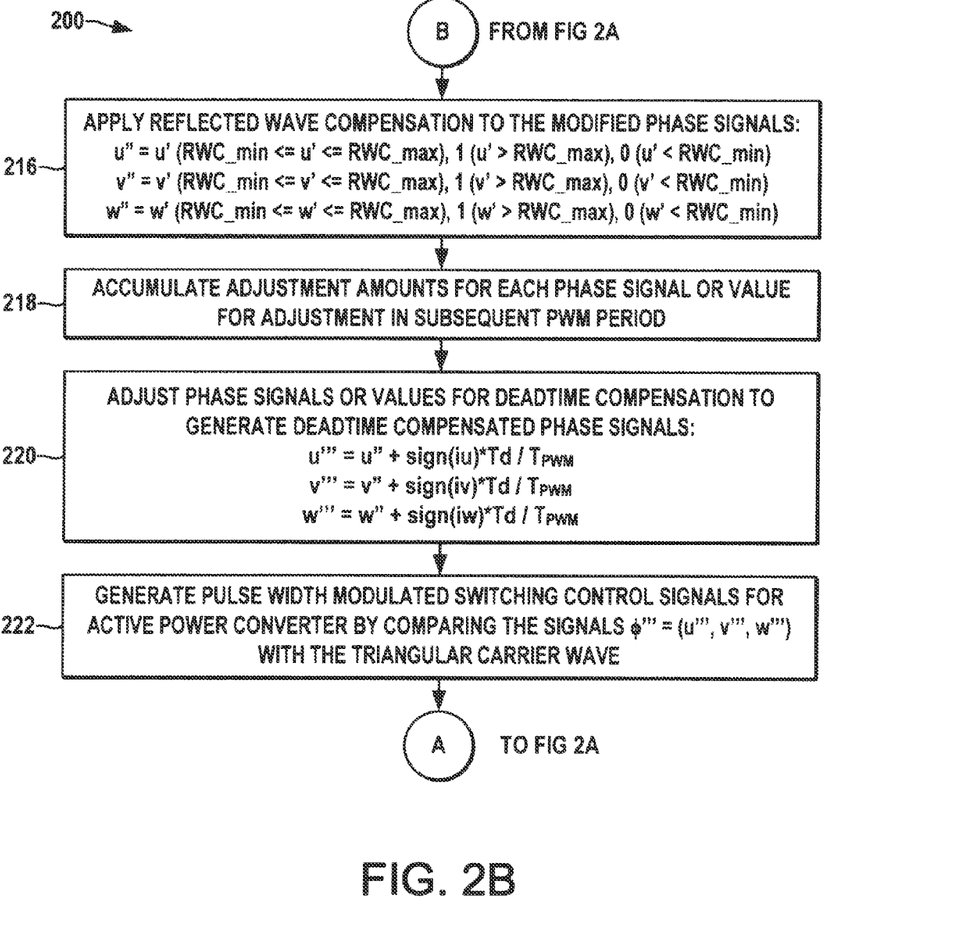

An exemplary process 200 is illustrated in FIGS. 2A and 2B by which the switch control system 140 generates the pulse width modulated switching control signals 142b for the inverter 110b using space vector modulation according to a set of switching sequences 169 for each sector of a space vector modulation diagram 250 (FIG. 3). Although the PWM power converter control method 200 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, processor-executed software, or combinations thereof, in order to provide the pulse width modulation control functionality described herein, and may be employed in any power conversion system including but not limited to the above illustrated system 110, wherein the disclosure is not limited to the specific applications and embodiments illustrated and described herein.

The process 200 begins for a new PWM period at 202 in FIG. 2A with the switch control system 140 obtaining a current common mode dwell time $T_{dwell\_CM}$. In certain embodiments, the common mode dwell time $T_{dwell\_CM}$ is a stored value in a memory of the controller 140, and which may be determined analytically once maximum output cable length and PWM frequency are known for a given implementation. In one example, the PWM period $T_{PWM}$ may be 500 μs for pulse width modulation at PWM frequency of 2 kHz frequency. An exemplary value of the common mode dwell time $T_{dwell\_CM}$ is about 4 μs for PWM carrier frequencies of 2 kHz, 4 kHz, and 8 kHz for shielded cable lengths of up to 600 feet. The inventors have further appreciated that common-mode currents are worse with shielded cable vs. unshielded cable, at higher PWM carrier frequencies, and at low output fundamental frequencies particularly close to 0 Hz. In certain embodiments, moreover, the switch control system 140 is operative to receive the common mode dwell time $T_{dwell\_CM}$ from an external source 172, such as from a user interface, another control component, a network, etc.

At 204 in FIG. 2A, a reference vector location is determined (e.g., reference vector 171 in the SVM diagram 250 of FIG. 3) based on feedback signals or values and received setpoint information. For instance, the desired motor position and torque may be represented in terms of the magnitude and angle of the vector 171, and the modulation index is determined at 204 according to the magnitude of the reference vector 171. In certain embodiments, the switch control system 140 is operative at 205 in FIG. 2A to selectively adjust the common mode dwell time $T_{dwell\_CM}$ at least partially according to a modulation index associated with the position of the reference vector 171 in the space vector modulation diagram 250. In certain implementations, for example, the dwell time $T_{dwell\_CM}$ is increased for lower modulation index values and decreased for higher modulation index values, wherein the relationship can be linear or non-linear and can be maintained for an entire range of modulation index or only over a portion of a modulation index range. The controller 140 generates signals or values at 206 which represent the AC phase outputs ϕ (e.g., u, v, and w) based on the reference vector 171. In addition, the controller 144 adds any accumulated adjustment amounts to the phase signals (feedback signals ϕ) at 208 from previous PWM periods.

At 210-214 in FIG. 2A, the common mode reduction component 162 implements selective common mode reduction at each pulse width modulation period $T_{PWM}$, including determining max, mid, and min ones of the feedback signals or values ϕ) at 210. Based on this determination, the component 162 selectively adjusts one or more feedback signals or values ϕ higher or lower at 212 to generate common mode compensated feedback signals or values ϕ' based in whole or in part on the common mode dwell time $T_{dwell\_CM}$ to provide minimum differences between the adjusted feedback signals or values φ'. In certain embodiments, this is done according to the following equations (1) and (2):

$$\max' - \mathrm{mid}' \geq 2(T_{dwell\_CM}/T_{PWM}), \text{ and} \quad (1)$$

$$\mathrm{mid}' - \min' \geq 2(T_{dwell\_CM}/T_{PWM}). \quad (2)$$

At 214, the common mode reduction component 162 creates the common mode compensated feedback phase signals or values φ'=(u', v', w'). In some embodiments, these signals or values φ' are used directly by the PWM component 168 to generate the inverter switching control signals 142b.

Figure 4A:
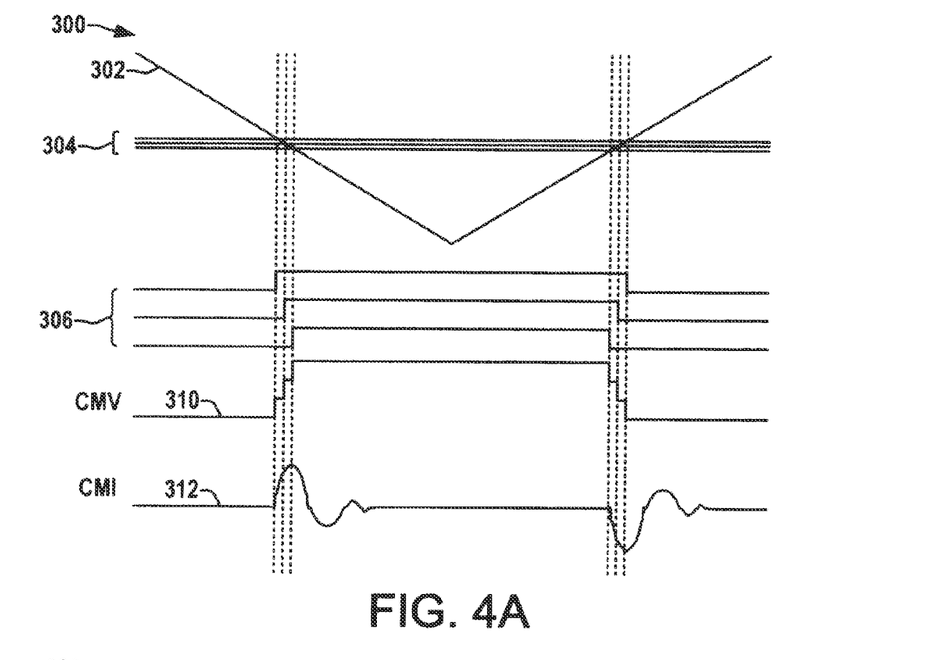
FIGS. 4A and 4B are timing diagrams illustrating selective common mode reduction adjustment of modulating feedback signals based at least partially on a common mode dwell time according to various aspects of the present disclosure.
Figure 4B:
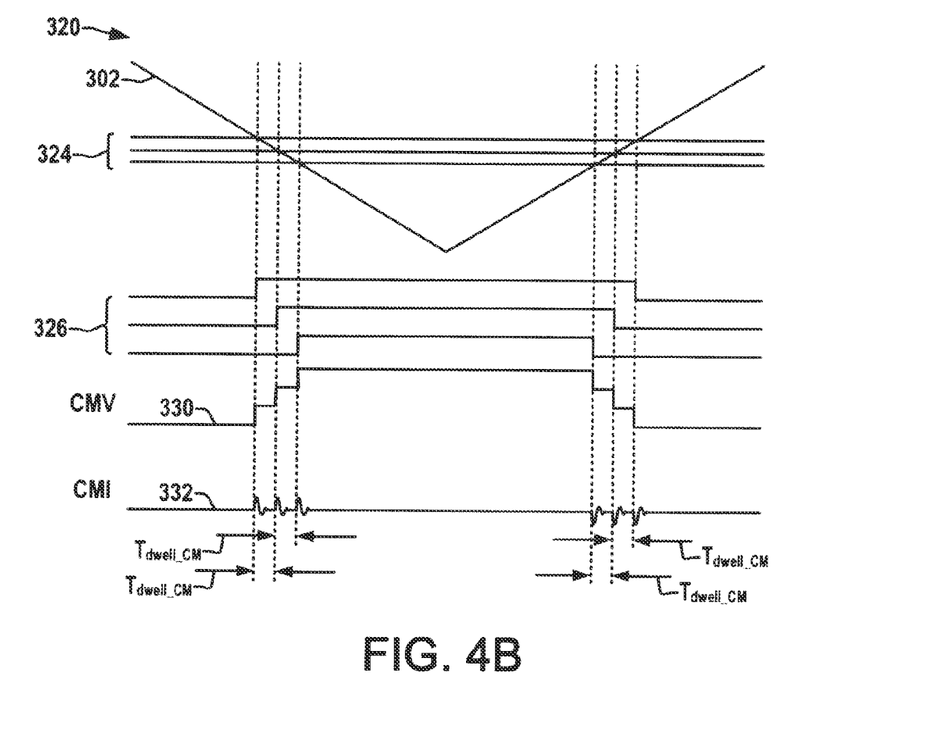

FIGS. 4A and 4B show timing diagrams 300 and 320, respectively, with diagram 300 showing the triangle carrier wave 302 and the feedback signals 3044) (u, v, w). This diagram 300 also illustrates exemplary switching signals 306 indicating the relative timing of the prospective transitions if the unmodified signals φ were to be used without common mode compensation. As seen in FIG. 4A, such switching provides little spacing between switching transitions, and results in common mode voltage levels 310 and relatively high common mode current levels 312. As shown in FIG. 4B, on the other hand, the exemplary common mode reduction component 162 adjusts one or more of the signals or values φ at 212 to generate common mode compensated feedback signals or values 324 (φ') according to the dwell time $T_{dwell\_CM}$ using equations (1) and (2) above to provide minimum differences between the adjusted feedback signals or values φ'. This results in further spaced switching transitions 326, thereby providing better controlled common mode current levels 330 and 332 as shown in FIG. 4B.

Referring to FIG. 2B, the inverter control component 144b may optionally provide additional compensation at 216 for reflected wave reduction and/or for deadtime compensation at 220. At 216, the reflected wave reduction component 164 selectively adjusts one or more of the common mode compensated feedback signals or values φ' higher or lower to provide reflected wave compensated signals or values φ'' based at least partially on one or more reflected wave compensation limit values RWC. In the illustrated example, the reflected wave compensation component 164 adjusts the signals or values φ' according to the following equation (3):

$$\phi'' = \phi' \text{ if } (\mathrm{RWC\_min} <= \phi' <= \mathrm{RWC\_max}), \quad (3)$$

$$\phi'' = 1 \text{ if } (\phi' > \mathrm{RWC\_max}), \text{ and}$$

$$\phi'' = 0 \text{ if } (\phi' < \mathrm{RWC\_min}),$$

where φ' are the common mode compensated feedback signals or values (u', v', w'), φ'' are the reflected wave compensated signals or values (u'', v'', w''), RWC_min is a lower reflected wave compensation limit value, and RWC_max is an upper reflected wave compensation limit value. The RWC limit value(s) can be set by a user, or may be programmed into memory of the controller 140, and/or may be received by the controller 140 from an external source 172.

At 218, the controller 140 accumulates adjustment amounts for each phase signal or value for adjustment in a subsequent PWM period.

At 220, in certain embodiments, the deadtime compensation component 160 is utilized. The inventors have appreciated that since the inverter 110b includes upper and lower switches for each of the three output phases u, v, and w, a transition in a given phase φ, for instance, from 1 to 0 with the top switch on, the controller 140 needs to commutate and turn the bottom switch on, leading to a deadtime when both switches are turned off (the time between turning the top switch off and turning the bottom switch on (or vice versa)) so as to avoid short-circuiting the DC circuit 150. This is a function of the physical limitations of IGBTs or other switching devices, because the switches don't turn off instantaneously. As shown in FIG. 1C above, the inventors have appreciated that when both switches are off (to achieve the deadtime), the output voltage of that particular phase is not controlled, and depending upon the current flowing in that particular phase, one of the anti-parallel diodes (across the IGBT switch) tends to clamp either up or down. As a result, the desired volt-second balance of the control scheme will not be assured, because during the deadtime interval, the phase voltage can either be clamped up or down, and thus the phase voltage is essentially uncontrolled. The resulting control error is particularly significant at very low speeds when the output voltages are also low, because the desired phase voltages are far away from Vdc. For example, a 460 volt motor at 60 Hz nominal may be running at 5 Hz and at a very low voltage, and the error caused by the deadtime (when the anti-parallel diode clamps the phase voltage to either 0 volts or Vdc) can be large, leading to distortion in the output voltage.

To combat this, the deadtime compensation component 160 in certain embodiments operates at 220 in FIG. 2B to selectively adjust one or more of the reflected wave compensated signals or values φ'' (or the common mode compensated feedback signals or values φ' if no reflected wave reduction compensation was done) to provide deadtime compensated signals or values φ''' based at least partially on a deadtime value Td, which can be predetermined, programmed, or obtained from an external source 172. In certain embodiments, this is done using the following equation (4):

$$\phi''' = \phi'' + \mathrm{sign}(i_{\phi'}) \cdot (Td/T_{PWM}), \quad (4)$$

where $i_{\phi'}$ is a corresponding phase current.

At 222, the process 200 continues with the switching control system 140 generating PWM switching control signals 142b for the inverter 110b by comparing the signals φ''' with the triangular carrier wave, whether using direct digital modulation or carrier-based modulation. The generated signals 142b are thus applied to the inverter 110b in the current PWM period $T_{PWM}$, and the process 200 returns to 202 in FIG. 2A for the next PWM period $T_{PWM}$.

In accordance with further aspects of the present disclosure, a non-transitory, tangible, computer readable medium is provided, such as a computer memory, a memory within a power converter control system (e.g., switch control system 140 in FIGS. 1A and 1B above), a CD-ROM, floppy disk, flash drive, database, server, computer, etc.) which has computer executable instructions for performing the process steps of FIGS. 2A and 2B. The above disclosure thus provides techniques and apparatus for mitigating the adverse impact of common mode current generated by PWM AC drives on various components of the drive (e.g. printed circuit boards, magnetics, power devices) and overall performance of the drive, while addressing deadtime compensation and reflected wave reduction issues using select common-mode current reduction PWM switching sequences. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
a DC circuit comprising first and second DC current paths;
an inverter comprising a multi-phase AC connection having a plurality of AC terminals for supplying AC electrical power, and a switching network comprising a plurality of switching devices individually coupled between one of the DC current paths and one of the AC terminals, the switching devices individually operable to selectively electrically couple the corresponding DC current path with the corresponding AC terminal according to a corresponding switching control signal; and
a switch control system operative to provide the switching control signals by pulse width modulation at least partially according feedback signals or values representing AC phase outputs and according to the position of a reference vector in a space vector modulation diagram having a plurality of stationary active space vectors around the periphery of the diagram and two stationary zero vectors at an origin of the diagram, the vectors representing unique switching states for the switching network and defining a plurality of triangular sectors positioned around the origin, the sectors each being defined by a unique set of two active vectors and the zero vectors at the corners of the corresponding triangular sector, the switch control system providing the switching control signals according to a switching sequence corresponding to the diagram sector in which the reference vector is currently located, the switch control system comprising a common mode reduction component operative in each pulse width modulation period to determine max, mid, and min ones of the feedback signals or values, and to selectively adjust one or more feedback signals or values higher or lower to provide common mode compensated feedback signals or values having minimum differences therebetween based at least partially on a common mode dwell time.

2. The power conversion system of claim 1, wherein the common mode reduction component is operative in each pulse width modulation period to selectively adjust one or more of the feedback signals or values $\phi$ higher or lower according to the formulas $(\text{max}-\text{mid}) \geq 2(T_{dwell\_CM}/T_{PWM})$ and $(\text{mid}-\text{min}) \geq 2(T_{dwell\_CM}/T_{PWM})$ to provide the common mode compensated feedback signals or values, where $T_{dwell\_CM}$ is the common mode dwell time and where $T_{PWM}$ is the pulse width modulation period.

3. The power conversion system of claim 2, wherein the switch control system is operative in each pulse width modulation period to accumulate common mode adjustment amounts for each feedback signal or value and to adjust one or more feedback signals or values higher or lower in a subsequent pulse width modulation period to compensate for the common mode reduction adjustments made in a previous pulse width modulation period.

4. The power conversion system of claim 3, wherein the switch control system is operative to selectively adjust the common mode dwell time at least partially according to a modulation index associated with the position of the reference vector in the space vector modulation diagram.

5. The power conversion system of claim 4, wherein the switch control system is operative to receive the common mode dwell time from an external source.

6. The power conversion system of claim 4, wherein the switch control system further comprises a reflected wave compensation component operative to selectively adjust one or more of the common mode compensated feedback signals or values higher or lower to provide reflected wave compensated signals or values based at least partially on at least one reflected wave compensation limit value.

7. The power conversion system of claim 6, wherein the reflected wave compensation component is operative to selectively adjust one or more of the common mode compensated feedback signals or values higher or lower according to the following formula: $\phi''=\phi'$ if (RWC_min<= $\phi'$<=RWC_max), $\phi''=1$ if ($\phi'$>RWC_max), $\phi''=0$ if ($\phi'$<RWC_min), where $\phi'$ are the common mode compensated feedback signals or values, $\phi''$ are the reflected wave compensated signals or values, RWC_min is a lower reflected wave compensation limit value, and RWC_max is an upper reflected wave compensation limit value.

8. The power conversion system of claim 6, wherein the switch control system further comprises a deadtime compensation component operative to selectively adjust one or more of the common mode compensated feedback signals or values or to selectively adjust one or more of the reflected wave compensated signals or values to provide deadtime compensated signals or values based at least partially on a deadtime value.

9. The power conversion system of claim 8, wherein the deadtime compensation component is operative to selectively adjust one or more of the common mode compensated feedback signals or values or to selectively adjust one or more of the reflected wave compensated signals or values $\phi''$ to provide the deadtime compensated signals or values $\phi'''$ according to the following formula: $\phi'''=\phi''+\text{sign}(i_{\phi'}) \cdot (Td/T_{PWM})$, where $i_{\phi'}$ is a corresponding phase current, Td is the deadtime value, and $T_{PWM}$ is a pulse width modulation period.

10. The power conversion system of claim 4, wherein the switch control system further comprises a deadtime compensation component operative to selectively adjust one or more of the common mode compensated feedback signals or values $\phi'$ based at least partially on a deadtime value.

11. The power conversion system of claim 1, wherein the switch control system is operative to selectively adjust the common mode dwell time at least partially according to a modulation index associated with the position of the reference vector in the space vector modulation diagram.

12. The power conversion system of claim 11, wherein the switch control system is operative to receive the common mode dwell time from an external source.

13. The power conversion system of claim 1, wherein the switch control system is operative to receive the common mode dwell time from an external source.

14. The power conversion system of claim 1, wherein the switch control system further comprises a reflected wave compensation component operative to selectively adjust one or more of the common mode compensated feedback signals or values higher or lower to provide reflected wave compensated signals or values based at least partially on at least one reflected wave compensation limit value.

15. The power conversion system of claim 14, wherein the switch control system further comprises a deadtime compensation component operative to selectively adjust one or more of the common mode compensated feedback signals or values or to selectively adjust one or more of the reflected wave compensated signals or values to provide deadtime compensated signals or values based at least partially on a deadtime value.

16. The power conversion system of claim 1, wherein the switch control system further comprises a deadtime compensation component operative to selectively adjust one or more of the common mode compensated feedback signals or values to provide deadtime compensated signals or values based at least partially on a deadtime value.

17. The power conversion system of claim 1, wherein the switch control system comprises a carrier-based pulse width modulation system including a carrier wave generator, at least one comparator operative to compare a carrier wave from the generator with the one or more feedback signals or values, and a set of switching sequences to provide the switching control signals by pulse width modulation based on an output of the at least one comparator.

18. A method for mitigating common mode currents in a power conversion system having a switching inverter, the method comprising:
provide pulse width modulated inverter switching control signals to a plurality of inverter switching devices of the switching inverter to convert DC power to cause the inverter to selectively provide multi-phase AC electrical output power at least partially according feedback signals or values representing AC phase outputs and according to the position of a reference vector in a space vector modulation diagram;
determining max, mid, and min ones of the feedback signals or values in each pulse width modulation period; and
selectively adjusting one or more feedback signals or values higher or lower to provide common mode compensated feedback signals or values having minimum differences therebetween based at least partially on a common mode dwell time in each pulse width modulation period.

19. The method of claim 18, wherein one or more of the feedback signals or values are adjusted higher or lower according to the formulas $(\text{max}-\text{mid}) \geq 2(T_{dwell\_CM}/T_{PWM})$ and $(\text{mid}-\text{min}) \geq 2(T_{dwell\_CM}/T_{PWM})$, where $T_{dwell\_CM}$ is the common mode dwell time and where $T_{PWM}$ is the pulse width modulation period.

20. The method of claim 18, further comprising:
accumulating common mode adjustment amounts for each feedback signal or value φ in each pulse width modulation period; and
adjusting one or more feedback signals or values higher or lower in a subsequent pulse width modulation period to compensate for the common mode reduction adjustments made in a previous pulse width modulation period.

21. The method of claim 18, further comprising selectively adjusting the common mode dwell time at least partially according to a modulation index associated with the position of the reference vector in the space vector modulation diagram.

22. The method of claim 21, further comprising receiving the common mode dwell time from an external source.

23. The method of claim 18, further comprising receiving the common mode dwell time from an external source.

* * * * *